United States Patent
Baurmeister et al.

(10) Patent No.: US 7,661,542 B2
(45) Date of Patent: *Feb. 16, 2010

(54) PROTON-CONDUCTING POLYMER MEMBRANE THAT CONTAINS POLYAZOLES AND IS COATED WITH A CATALYST LAYER, AND APPLICATION THEROF IN FUEL CELLS

(75) Inventors: Jochen Baurmeister, Eppstein (DE); Isabel Kundler, Königstein (DE); Christoph Padberg, Wiesbaden (DE); Oemer Uensal, Mainz (DE); Joachim Kiefer, Losheim Am See (DE); Gordon Calundann, North Plainfield, NJ (US); Brian Benicewicz, Loudonville, NY (US); Mathias Weber, Rüsselsheim (DE)

(73) Assignee: BASF Fuel Cell GmbH (DE)

( * ) Notice: Subject to any disclaimer, the term of this patent is extended or adjusted under 35 U.S.C. 154(b) by 872 days.

This patent is subject to a terminal disclaimer.

(21) Appl. No.: 10/530,242

(22) PCT Filed: Oct. 2, 2003

(86) PCT No.: PCT/EP03/10903

§ 371 (c)(1),
(2), (4) Date: Jun. 6, 2005

(87) PCT Pub. No.: WO2004/034498

PCT Pub. Date: Apr. 22, 2004

(65) Prior Publication Data

US 2006/0079392 A1    Apr. 13, 2006

(30) Foreign Application Priority Data

Oct. 4, 2002    (DE) ................. 102 46 372

(51) Int. Cl.
*B01D 39/00*    (2006.01)
*B01D 39/14*    (2006.01)
*C25B 13/00*    (2006.01)
*C22C 33/08*    (2006.01)

(52) U.S. Cl. ................. 210/500.39; 210/500.27; 210/490; 204/296; 429/30

(58) Field of Classification Search ........... 210/500.39, 210/500.38, 500.27, 500.28; 264/41; 429/33, 429/30, 306, 41, 44; 521/33, 27; 548/335.11, 548/343.5, 156; 96/4

See application file for complete search history.

(56) References Cited

U.S. PATENT DOCUMENTS

| 3,313,783 | A | * | 4/1967 | Iwakura et al. ............... 528/336 |
| 3,692,569 | A |   | 9/1972 | Grot |
| 4,191,618 | A |   | 3/1980 | Coker et al. |
| 4,212,714 | A |   | 7/1980 | Coker et al. |
| 4,333,805 | A |   | 6/1982 | Davidson et al. |
| 4,453,991 | A |   | 6/1984 | Grot |
| 4,693,825 | A | * | 9/1987 | Trouw ................. 210/500.28 |
| 5,211,984 | A | * | 5/1993 | Wilson ................. 427/115 |
| 5,422,411 | A |   | 6/1995 | Wei et al. |
| 5,525,436 | A |   | 6/1996 | Savinell et al. |
| 5,738,905 | A |   | 4/1998 | Bevers |
| 5,761,793 | A |   | 6/1998 | Bevers et al. |
| 6,110,616 | A |   | 8/2000 | Sheikh-Ali et al. |
| 6,703,076 | B1 | * | 3/2004 | Gupta et al. ................. 427/282 |
| 6,790,931 | B2 |   | 9/2004 | Cui et al. |
| 7,229,553 | B2 | * | 6/2007 | Uensal et al. ........... 210/500.28 |
| 7,235,320 | B2 |   | 6/2007 | Calundann et al. |
| 7,332,530 | B2 |   | 2/2008 | Kiefer et al. |
| 7,384,552 | B2 | * | 6/2008 | Calundann et al. ..... 210/500.38 |
| 2004/0062969 | A1 | | 4/2004 | Sakaguchi et al. |
| 2004/0096734 | A1 | | 5/2004 | Calundann et al. |
| 2004/0127588 | A1 | | 7/2004 | Calundann et al. |
| 2004/0186189 | A1 | * | 9/2004 | Muller et al. ................. 521/27 |
| 2004/0262227 | A1 | | 12/2004 | Kiefer et al. |
| 2005/0053820 | A1 | | 3/2005 | Calundann et al. |
| 2005/0074654 | A1 | | 4/2005 | Kiefer et al. |
| 2005/0084727 | A1 | | 4/2005 | Kiefer et al. |
| 2005/0118477 | A1 | | 6/2005 | Kiefer et al. |
| 2005/0118478 | A1 | | 6/2005 | Kiefer et al. |
| 2005/0147859 | A1 | | 7/2005 | Kiefer et al. |
| 2005/0175879 | A1 | | 8/2005 | Kiefer et al. |
| 2005/0181254 | A1 | | 8/2005 | Uensal et al. |
| 2005/0244694 | A1 | | 11/2005 | Kiefer et al. |
| 2005/0256296 | A1 | | 11/2005 | Kiefer et al. |
| 2006/0008690 | A1 | | 1/2006 | Uensal et al. |
| 2006/0035095 | A1 | | 2/2006 | Calundann et al. |
| 2006/0057449 | A1 | | 3/2006 | Calundann et al. |
| 2006/0078774 | A1 | | 4/2006 | Uensal et al. |
| 2006/0166067 | A1 | | 7/2006 | Kiefer et al. |

(Continued)

FOREIGN PATENT DOCUMENTS

DE    195 09 748    10/1996

(Continued)

*Primary Examiner*—Ana M Fortuna
(74) *Attorney, Agent, or Firm*—Connolly Bove Lodge & Hutz LLP

(57) ABSTRACT

The present invention relates to a proton-conducting polymer membrane which comprises polyazoles and is coated with a catalyst layer and is obtainable by a process comprising the steps
A) preparation of a mixture comprising polyphosphoric acid, at least one polyazole (polymer A) and/or one or more compounds which are suitable for forming polyazoles under the action of heat according to step B),
B) heating of the mixture obtainable according to step A) under inert gas to temperatures of up to 400° C.,
C) application of a layer using the mixture obtained according to step A) and/or B) to a support,
D) treatment of the membrane formed in step C) until it is self-supporting,
E) application of at least one catalyst-containing coating to the membrane formed in step C) and/or in step D).

32 Claims, No Drawings

U.S. PATENT DOCUMENTS

| | | |
|---|---|---|
| 2006/0183012 A1 | 8/2006 | Uensal et al. |
| 2006/0210881 A1 | 9/2006 | Calundann et al. |
| 2006/0234099 A1 | 10/2006 | Muellen |
| 2007/0102361 A1 | 5/2007 | Kiefer et al. |
| 2007/0292734 A1 | 12/2007 | Kiefer et al. |
| 2008/0026277 A1 | 1/2008 | Peterson et al. |
| 2008/0038624 A1 | 2/2008 | Belack et al. |

FOREIGN PATENT DOCUMENTS

| | | |
|---|---|---|
| DE | 195 09 749 | 10/1996 |
| DE | 195 27 435 | 1/1997 |
| DE | 197 57 492 | 7/1999 |
| DE | 199 59 289 | 6/2001 |
| EP | 1 354 907 | 10/2003 |
| WO | WO-92/15121 | 9/1992 |
| WO | WO-96/01177 | 1/1996 |
| WO | WO-96/13872 | 5/1996 |
| WO | WO-00/26982 | 5/2000 |
| WO | WO-01/18894 | 3/2001 |
| WO | WO-02/38650 | 5/2002 |
| WO | WO-02/081547 | 10/2002 |
| WO | WO-02/088219 | 11/2002 |
| WO | WO 2002/088219 | 11/2002 |
| WO | WO-03/007411 | 1/2003 |
| WO | WO-03/022412 | 3/2003 |
| WO | WO 2006/117199 | 11/2006 |

* cited by examiner

PROTON-CONDUCTING POLYMER MEMBRANE THAT CONTAINS POLYAZOLES AND IS COATED WITH A CATALYST LAYER, AND APPLICATION THEROF IN FUEL CELLS

RELATED APPLICATIONS

This application is a national stage application (under 35 U.S.C. 371) of PCT/EP2003/010903 filed Oct. 2, 2003 which claims benefit to German application 102 46 372.7 filed Oct. 4, 2002.

The present invention relates to a proton-conducting polymer electrolyte membrane which comprises polyazole blends and is coated with a catalyst layer and can, owing to its excellent chemical and thermal properties, be used for a variety of purposes, in particular as polymer electrolyte membrane (PEM) in PEM fuel cells.

A fuel cell usually comprises an electrolyte and two electrodes separated by the electrolyte. In the case of a fuel cell, a fuel such as hydrogen gas or a methanol/water mixture is supplied to one of the two electrodes and an oxidant such as oxygen gas or air is supplied to the other electrode and chemical energy from the oxidation of the fuel is in this way converted directly into electric energy. The oxidation reaction forms protons and electrons.

The electrolyte is permeable to hydrogen ions, i.e. protons, but not to reactive fuels such as the hydrogen gas or methanol and the oxygen gas.

A fuel cell generally comprises a plurality of single cells known as MEUs (membrane-electrode unit) which each comprise an electrolyte and two electrodes separated by the electrolytes.

Electrolytes employed for the fuel cell are solids such as polymer electrolyte membranes or liquids such as phosphoric acid. Recently, polymer electrolyte membranes have attracted attention as electrolytes for fuel cells.

For example, polymer electrolyte membranes comprising complexes of basic polymers and strong acids have been developed. Thus, WO96/13872 and the corresponding U.S. Pat. No. 5,525,436 describe a process for producing a proton-conducting polymer electrolyte membrane, in which a basic polymer such as polybenzimidazole is treated with a strong acid such as phosphoric acid, sulfuric acid, etc.

In *J. Electrochem. Soc.*, Volume 142, No. 7, 1995, pp. L121-L123, describes doping of a polybenzimidazole in phosphoric acid.

In the case of the basic polymer membranes known from the prior art, the mineral acid (usually concentrated phosphoric acid) used for achieving the necessary proton conductivity is usually added after shaping of the polyazole film. This polymer here serves as support for the electrolyte consisting of the highly concentrated phosphoric acid. The polymer membrane in this case fulfills further important functions, in particular it has to have a high mechanical stability and serve as separator for the two fuels mentioned at the outset.

Significant advantages of such a membrane doped with phosphoric acid is the fact that a fuel cell in which such a polymer electrolyte membrane is used can be operated at temperatures above 100° C. without the moistening of the fuel cell which is otherwise necessary. This is due to the ability of the phosphoric acid to transport protons without additional water by means of the Grotthus mechanism (K.-D. Kreuer, Chem. Mater. 1996, 8, 610-641).

The possibility of operation at temperatures above 100° C. results in further advantages for the fuel cell system. Firstly, the sensitivity of the Pt catalyst to impurities in the gas, in particular CO, is greatly reduced. CO is formed as by-product in the reforming of the hydrogen-rich gas comprising carbon-containing compounds, e.g. natural gas, methanol or petroleum spirit, or as intermediate in the direct oxidation of methanol. The CO content of the fuel typically has to be less than 100 ppm at temperatures of <100° C. However, at temperatures in the range 150-200° C., 10 000 ppm or more of CO can also be tolerated (N. J. Bjerrum et al. Journal of Applied Electrochemistry, 2001, 31, 773-779). This leads to significant simplifications of the upstream reforming process and thus to cost reductions for the total fuel cell system.

The performance of a membrane-electrode unit produced using such membranes is described in WO 01/18894 A2. In a 5 $cm^2$ cell, at a gas flow of 160 ml/min and a gauge pressure of 1 atm for pure hydrogen and at a gas flow of 200 m/min and a gauge pressure of 1 atm for pure oxygen. However, the use of pure oxygen, such a high gauge pressure and such high stoichiometries is of no interest in industry.

The performance of such polyazole membranes doped with phosphoric acid when using pure hydrogen and pure oxygen is likewise described in Electrochimica Acta, Volume 41, 1996, 193-197. At a platinum loading of 0.5 $mg/cm^2$ on the anode and 2 $mg/cm^2$ on the cathode, a current density of less than 0.2 $A/cm^2$ at a voltage of 0.6 V is achieved when using humidified fuel gases consisting of pure hydrogen and pure oxygen at a gauge pressure of 1 atm for each fuel gas. When air is used in place of oxygen, this value drops to less than 0.1 $A/cm^2$.

A great advantage of fuel cells is the fact that the electrochemical reaction converts the energy of the fuel directly into electric energy and heat. Water is formed as reaction product at the cathode. Heat is thus generated as by-product in the electrochemical reaction. In the case of applications in which only the electric power is utilized for driving electric motors, e.g. in automobile applications, or as replacement for battery systems in many applications, part of the heat formed in the reaction has to be removed in order to avoid overheating of the system. Additional, energy-consuming equipment is then necessary for cooling, and this further reduces the total electrical efficiency of the fuel cell. In the case of stationary applications such as central or decentralized generation of power and heat, the heat can be utilized efficiently by means of existing technologies, e.g. heat exchangers. High temperatures are sought here to increase the efficiency. If the operating temperature is above 100° C. and the temperature difference between ambient temperature and the operating temperature is large, it is possible to cool the fuel cell system more efficiently or employ small cooling areas and dispense with additional equipment compared to fuel cells which have to be operated at below 100° C. because of the moistening of the membrane.

However, besides these advantages, such a fuel cell system also has disadvantages. Thus, the durability of membranes doped with phosphoric acid is relatively limited. The life in this case is significantly reduced by, in particular, operation of the fuel cell at below 100° C., for example at 80° C. However, it needs to be stated in this context that the cell has to be operated at these temperatures during start-up and shutdown of the fuel cell.

Furthermore, the production of membranes doped with phosphoric acid is relatively expensive, since it is usual firstly to form a polymer which is subsequently cast with the aid of a solvent to produce a film. After drying of the film, it is doped with an acid in a final step. The polymer membranes known hitherto therefore have a high content of dimethylacetamide (DMAc) which cannot be removed completely by means of known drying methods.

In addition, the performance, for example the conductivity, of known membranes is still in need of improvement.

Furthermore, the durability of known high-temperature membranes having a high conductivity is still in need of improvement.

In addition, a very large amount of catalytically active substances is used to obtain a membrane-electrode unit.

It is therefore an object of the present invention to provide a novel polymer electrolyte membrane which solves the abovementioned problems. In particular, a membrane according to the invention should be able to be produced inexpensively and simply.

A further object of the present invention was to create polymer electrolyte membranes which display good performance, in particular a high conductivity over a wide temperature range. This conductivity should be able to be achieved without additional moistening, especially at high temperatures. The membrane should be able to be processed further to produce a membrane-electrode unit which can give particularly high power densities. In addition, a membrane-electrode unit obtainable by use of the membrane according to the invention should have a particularly good durability, in particular a long life at high power densities.

Furthermore, it was an object of the present invention to provide a membrane which can be converted into a membrane-electrode unit which displays good performance even at a very low content of catalytically active substances such as platinum, ruthenium or palladium.

A further object of the invention was to provide a membrane which can be pressed to form a membrane-electrode unit and allows the fuel cell to be operated at low stoichiometries, at a low gas flow and/or at a low gauge pressure at a high power density.

Furthermore, the operating temperature should be able to be extended to the range from <80° C. to 200° C. without the life of the fuel cell being greatly reduced.

These objects are achieved by a proton-conducting polymer membrane which comprises polyazoles and is coated with a catalyst layer and has all the features of claim 1.

A membrane according to the invention displays a high conductivity over a wide temperature range, and this is also achieved without additional moistening. Furthermore, a membrane according to the invention can be produced simply and inexpensively. In particular, large amounts of expensive solvents such as dimethylacetamide can be dispensed with.

Furthermore, these membranes display a surprisingly long life. Furthermore, a fuel cell equipped with a membrane according to the invention can also be operated at low temperatures, for example at 80° C., without the life of the fuel cell being greatly reduced thereby.

In addition, the membrane can be processed further to produce a membrane-electrode unit which can give particularly high electric currents. A membrane-electrode unit obtained in this way has a particularly good durability, in particular a long life at high electric currents.

Furthermore, the membrane of the present invention can be converted into a membrane-electrode unit which displays good performance even at a very low content of catalytically active substances such as platinum, ruthenium or palladium.

The present invention provides a proton-conducting polymer membrane which comprises polyazoles and is coated with a catalyst layer and is obtainable by a process comprising the steps A) preparation of a mixture comprising polyphosphoric acid, at least one polyazole (polymer A) and/or one or more compounds which are suitable for forming polyazoles under the action of heat according to step B),
B) heating of the mixture obtainable according to step A) under inert gas to temperatures of up to 400° C.,
C) application of a layer using the mixture obtained according to step A) and/or B) to a support,
D) treatment of the membrane formed in step C) until it is self-supporting,
E) application of at least one catalyst layer to the membrane formed in step C) and/or in step D).

The composition prepared in step B) comprises polyazoles. These polymers can be added in step A) or they can be obtained from the monomers, oligomers and/or prepolymers on which the polymer is based during the heating in step B).

Polymers based on polyazole comprise recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

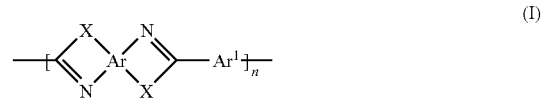
(I)

(II)

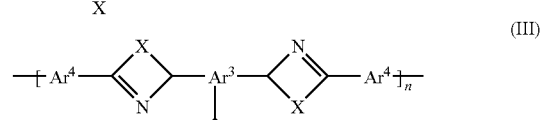
(III)

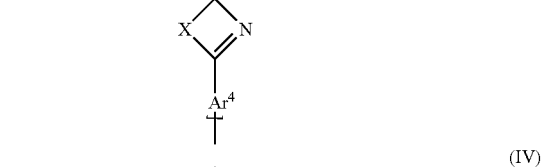
(IV)

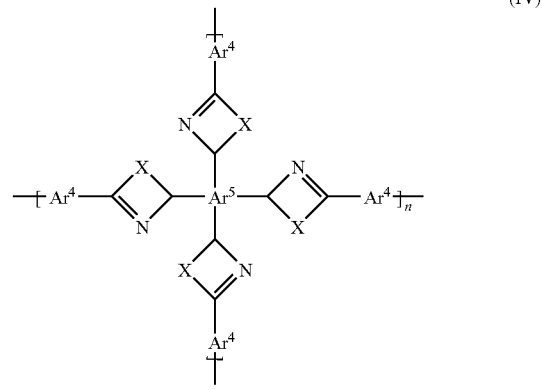
(V)

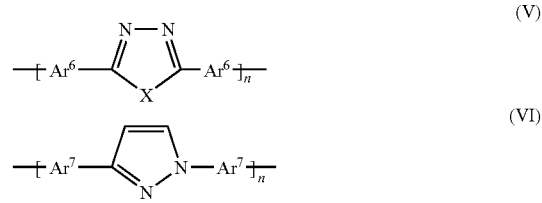
(VI)

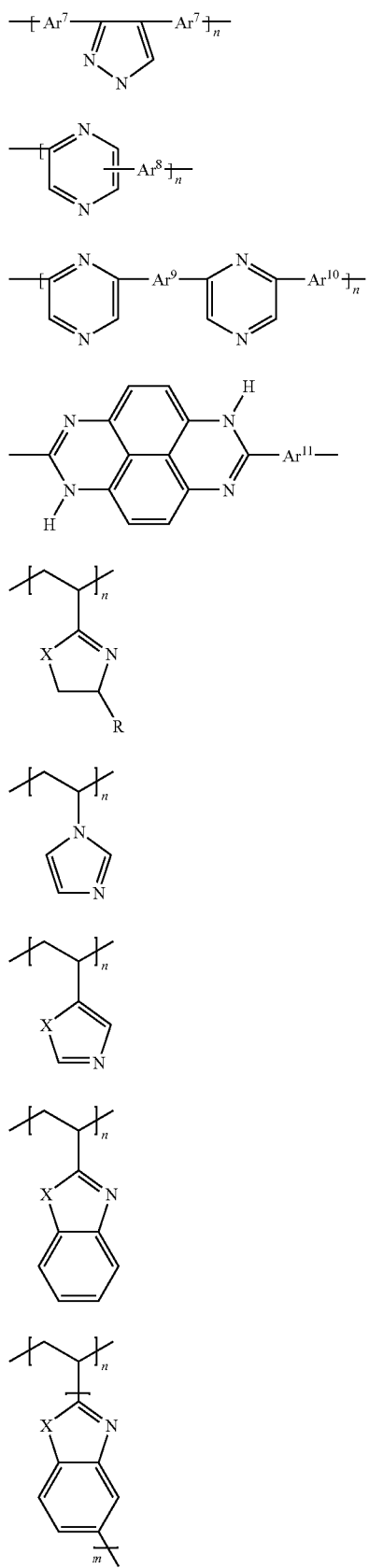
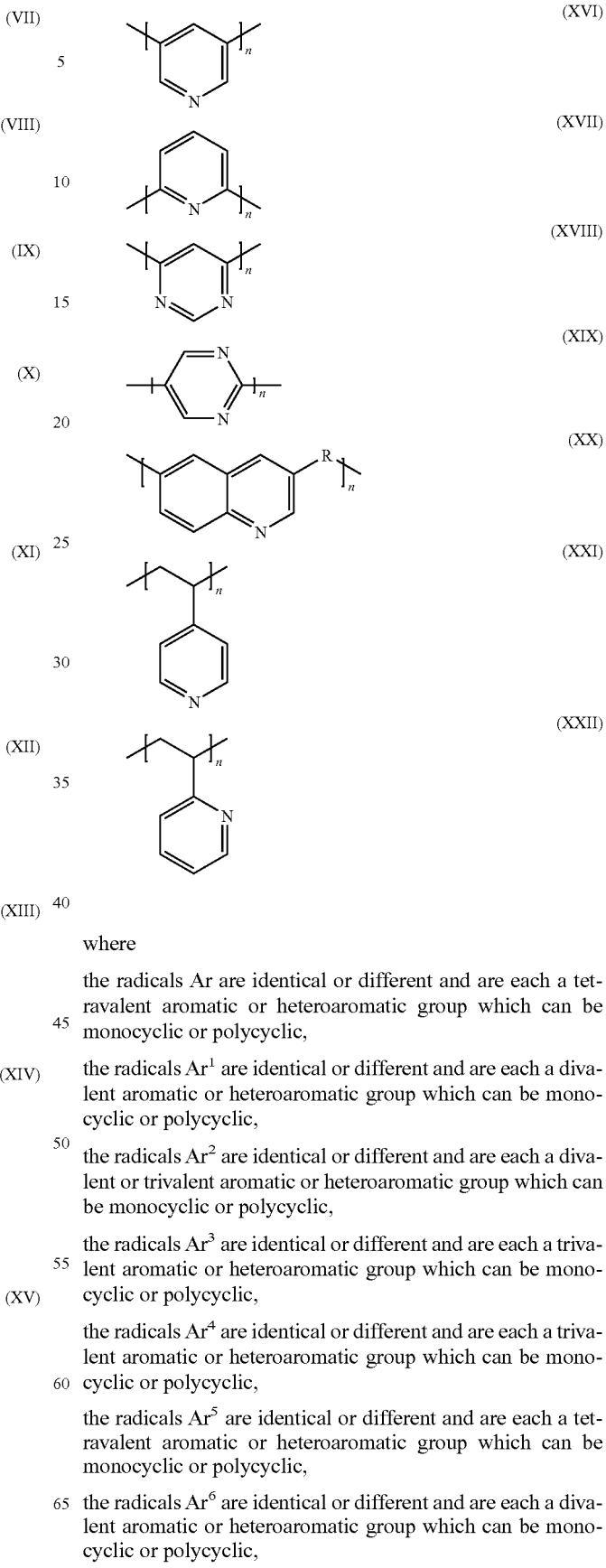

where the radicals Ar are identical or different and are each a tetravalent aromatic or heteroaromatic group which can be monocyclic or polycyclic, the radicals $Ar^1$ are identical or different and are each a divalent aromatic or heteroaromatic group which can be monocyclic or polycyclic, the radicals $Ar^2$ are identical or different and are each a divalent or trivalent aromatic or heteroaromatic group which can be monocyclic or polycyclic, the radicals $Ar^3$ are identical or different and are each a trivalent aromatic or heteroaromatic group which can be monocyclic or polycyclic, the radicals $Ar^4$ are identical or different and are each a trivalent aromatic or heteroaromatic group which can be monocyclic or polycyclic, the radicals $Ar^5$ are identical or different and are each a tetravalent aromatic or heteroaromatic group which can be monocyclic or polycyclic, the radicals $Ar^6$ are identical or different and are each a divalent aromatic or heteroaromatic group which can be monocyclic or polycyclic, the radicals Ar⁷ are identical or different and are each a divalent aromatic or heteroaromatic group which can be monocyclic or polycyclic, the radicals Ar⁸ are identical or different and are each a trivalent aromatic or heteroaromatic group which can be monocyclic or polycyclic, the radicals Ar⁹ are identical or different and are each a divalent or trivalent or tetravalent aromatic or heteroaromatic group which can be monocyclic or polycyclic, the radicals Ar¹⁰ are identical or different and are each a divalent or trivalent aromatic or heteroaromatic group which can be monocyclic or polycyclic, the radicals Ar¹¹ are identical or different and are each a divalent aromatic or heteroaromatic group which can be monocyclic or polycyclic, the radicals X are identical or different and are each oxygen, sulfur or an amino group which bears a hydrogen atom, a group having 1-20 carbon atoms, preferably a branched or unbranched alkyl or alkoxy group, or an aryl group as further radical, the radicals R are identical or different and are each hydrogen, an alkyl group or an aromatic group and n, m are each an integer greater than or equal to 10, preferably greater than or equal to 100.

Aromatic or heteroaromatic groups which are preferred according to the invention are derived from benzene, naphthalene, biphenyl, diphenyl ether, diphenylmethane, diphenyldimethylmethane, bisphenone, diphenyl sulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may also be substituted.

Ar¹, Ar⁴, Ar⁶, Ar⁷, Ar⁸, Ar⁹, Ar¹⁰, Ar¹¹ can have any substitution pattern; in the case of phenylene, Ar¹, Ar⁴, Ar⁶, Ar⁷, Ar⁸, Ar⁹, Ar¹⁰, Ar¹¹ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl and naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further preferred polyazole polymers are polyimidazoles, polybenzthiazoles, polybenzoxazoles, polyoxadiazoles, polyquinoxalines, polythiadiazoles, poly(pyridines), poly(pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising the recurring azole units is a polyazole comprising only units of the formula (I) and/or (II).

The number of recurring azole units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

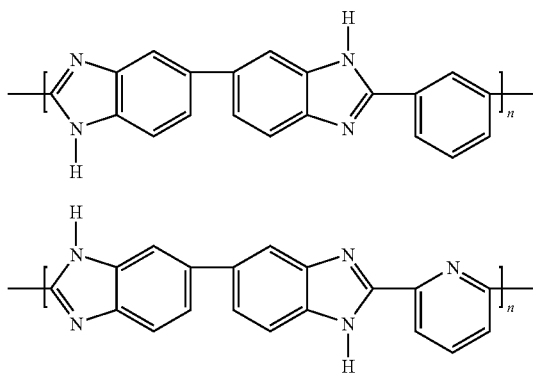
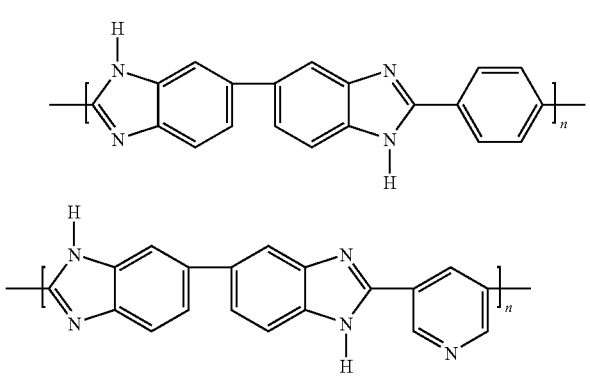

-continued
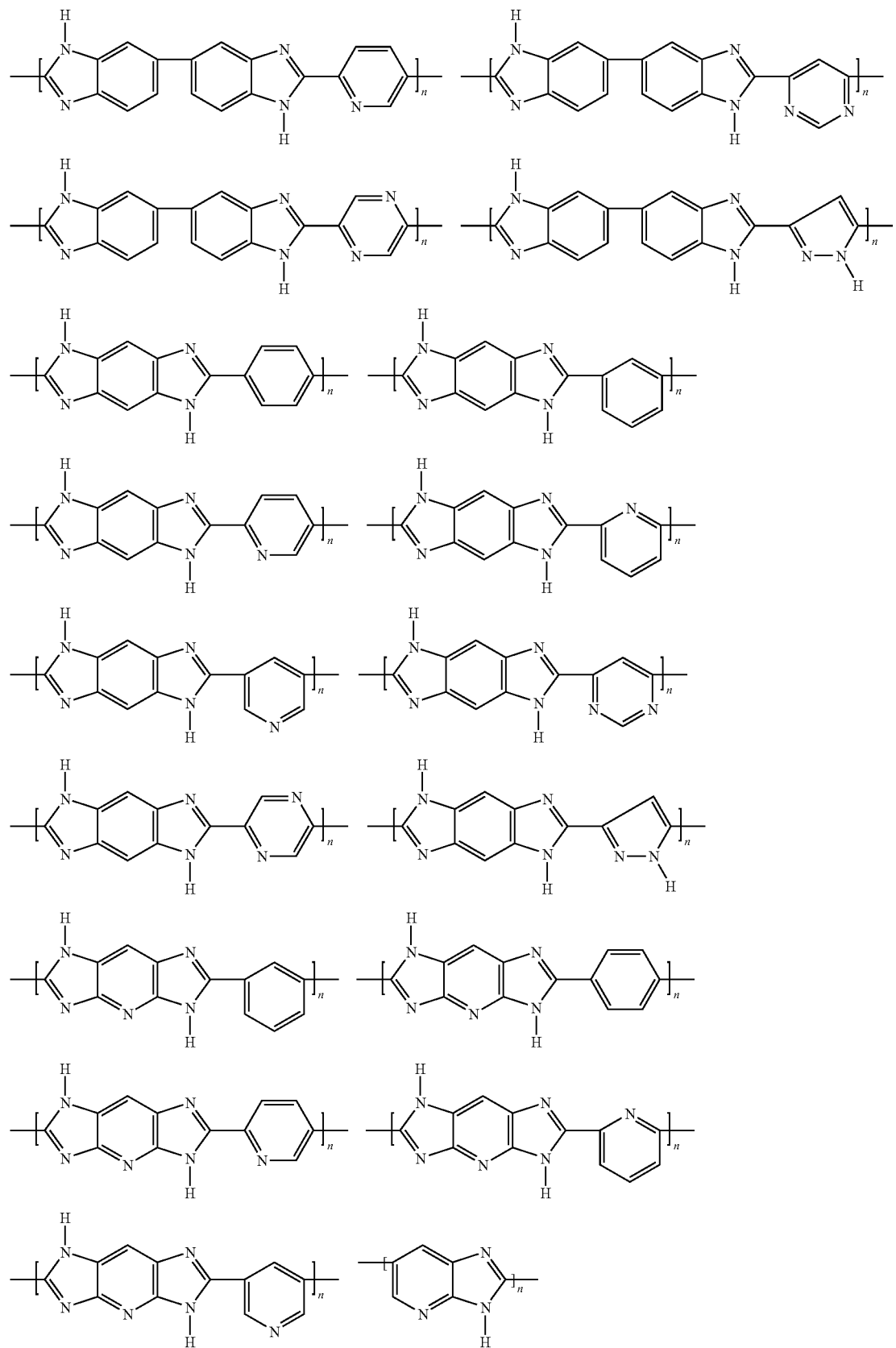

-continued

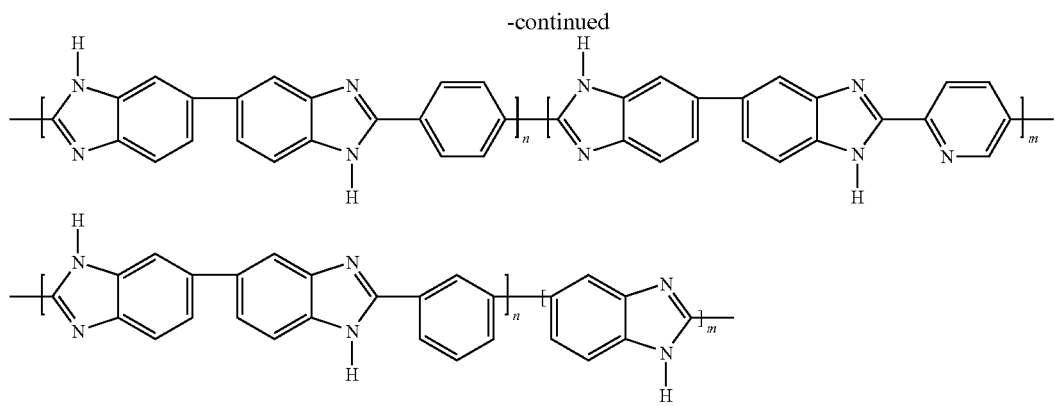

where n and m are each an integer greater than or equal to 10, preferably greater than or equal to 100.

The polyazoles used in step A), but in particular the polybenzimidazoles, have a high molecular weight. Measured as intrinsic viscosity, it is at least 0.2 dl/g, preferably from 0.3 to 10 dl/g and particularly preferably from 1 to 5 dl/g.

Furthermore, the polyazoles can also be prepared by heating in step B). For this purpose, one or more compounds which are suitable for forming polyazoles under the action of heat according to step B) can be added to the mixture prepared in step A).

Mixtures comprising one or more aromatic and/or heteroaromatic tetraamino compounds and one or more aromatic and/or heteroaromatic carboxylic acids or derivatives thereof which have at least two acid groups per carboxylic acid monomer are suitable for this purpose. Furthermore, one or more aromatic and/or heteroaromatic diaminocarboxylic acids can be used for the preparation of polyazoles.

The aromatic and heteroaromatic tertraamino compounds include, inter alia, 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane and 3,3',4,4'-tetraaminodiphenyldimethylmethane and their salts, in particular their monohydrochloride, dihydrochloride, trihydrochloride and tetrahydrochloride derivates. Among these, 3,3',4,4'-tetraaminobiphenyl, 2,3,5,6-tetraaminopyridine and 1,2,4,5-tetraaminobenzene are particularly preferred.

Furthermore, the mixture A) can comprise aromatic and/or heteroaromatic carboxylic acids. These are dicarboxylic acids and tricarboxylic acids and tetracarboxylic acids or their esters or their anhydrides or their acid halides, in particular their acid halides and/or acid bromides. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid, or their C1-C20-alkyl esters or C5-C12-aryl esters, or their acid anhydrides or their acid chlorides.

The aromatic tricarboxylic acids or their C1-C20-alkyl esters or C5-C12-aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1-C20-alkyl esters or C5-C12-aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids are heteroaromatic dicarboxylic acids and tricarboxylic acids and tetracarboxylic acids or their esters or their anhydrides. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

The content of tricarboxylic acids or tetracarboxylic acids (based on dicarboxylic acid used) is in the range from 0 to 30 mol %, preferably from 0.1 to 20 mol %, in particular from 0.5 to 10 mol %.

Furthermore, the mixture A) can also comprise aromatic and heteroaromatic diaminocarboxylic acids. These include, inter alia, diaminobenzoic acid, 4-phenoxycarbonylphenyl 3'4'-diaminophenyl ether and their monohydrochloride and dihydrochloride derivatives.

Preference is given to using mixtures of at least two different aromatic carboxylic acids in step A). Particular preference is given to using mixtures comprising heteroaromatic carboxylic acids in addition to aromatic carboxylic acids. The mixing ratio of aromatic carboxylic acids to heteroaromatic carboxylic acids is in the range from 1:99 to 99:1, preferably from 1:50 to 50:1.

These mixtures are, in particular, mixtures of N-heteroaromatic dicarboxylic acids and aromatic dicarboxylic acids. Non limiting examples of dicarboxylic acids are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

If a very high molecular weight is to be achieved, the molar ratio of carboxylic acid groups to amino groups in the reaction of tetraamino compounds with one or more aromatic carboxylic acids or esters thereof which have at least two acid groups per carboxylic acid monomer is preferably in the vicinity of 1:2.

The mixture prepared in step A) preferably comprises at least 0.5% by weight, in particular from 1 to 30% by weight and particularly preferably from 2 to 15% by weight, of monomers for the preparation of polyazoles.

If the polyazoles are prepared directly from the monomers in the polyphosphoric acid, the polyazoles have a high molecular weight. This is particularly true of the polybenzimidazoles. Measured as intrinsic viscosity, it is preferably in the range from 0.3 to 10 dl/g, in particular in the range from 1 to 5 dl/g.

If tricarboxylic acids or tetracarboxylic acids are also present in the mixture obtained in step A), they effect branching/crosslinking of the polymer formed. This contributes to an improvement in the mechanical properties.

In a further variant of the present invention, the mixture prepared in step A) comprises compounds which are suitable for forming polyazoles under the action of heat according to step B), with these compounds being obtainable by reaction of one or more aromatic and/or heteroaromatic tetraamino compounds with one or more aromatic and/or heteroaromatic carboxylic acids or derivatives thereof which have at least two acids group per carboxylic acid monomer or of one or more aromatic and/or heteroaromatic diaminocarboxylic acids in the melt at temperatures of up to 400° C., in particular up to 350° C., preferably up to 280° C. The compounds to be used for preparing these prepolymers have been described above.

The polyphosphoric acid used in step A) is a commercial polyphosphoric acid as is obtainable, for example, from Riedel-de Haen. The polyphosphoric acids $H_{n+2}P_nO_{3n+1}$ (n>1) usually have an assay calculated as $P_2O_5$ (acidimetry) of at least 83%. It is also possible for a dispersion/suspension to be produced instead of a solution of the monomers.

The mixture produced in step A) and/or step B) can also comprise dissolved, dispersed or suspended polymer. Such polymers can also be added to the mixture after step B).

Preferred polymers include, inter alia, polyolefins such as poly(chloroprene), polyacetylene, polyphenylene, poly(p-xylylene), polyarylmethylene, polyarmethylene, polystyrene, polymethylstyrene, polyvinyl alcohol, polyvinyl acetate, polyvinyl ether, polyvinylamine, poly(N-vinylacetamide), polyvinylimidazole, polyvinylcarbazole, polyvinylpyrrolidone, polyvinylpyridine, polyvinyl chloride, polyvinylidene chloride, polytetrafluoroethylene, polyhexafluoropropylene, copolymers of PTFE with hexafluoropropylene, with perfluoropropyl vinyl ether, with trifluoronitroisomethane, with sulfonyl fluoride vinyl ether, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular ones derived from norbornene;

polymers having C—O bonds in the main chain, for example polyacetal, polyoxymethylene, polyethers, polypropylene oxide, polyepichlorohydrin, polytetrahydrofuran, polyphenylene oxide, polyether ketone, polyesters, in particular polyhydroxyacetic acid, polyethylene terephthalate, polybutylene terephthalate, polyhydroxybenzoate, polyhydroxypropionic acid, polypivalolactone, polycaprolactone, polymalonic acid, polycarbonate;

polymers having C—S bonds in the main chain, for example polysulfide ether, polyphenylene sulfide, polyether sulfone;

polymers having C—N bonds in the main chain, for example polyimines, polyisocyanides, polyetherimine, polyaniline, polyamides, polyhydrazides, polyurethanes, polyimides, polyazoles, polyazines;

liquid-crystalline polymers, in particular Vectra, and inorganic polymers, for example polysilanes, polycarbosilanes, polysiloxanes, polysilicic acid, polysilicates, silicones, polyphosphazenes and polythiazyl.

Furthermore, the mixture produced in step A) and/or step B) can also comprise polymers having covalently bound acid groups. These polymers can also be added to the mixture after step B). These acid groups encompass, in particular, sulfonic acid groups. The polymers modified with sulfonic acid groups preferably have a content of sulfonic acid groups in the range from 0.5 to 3 meq/g. This value is determined via the ion exchange capacity (IEC).

To measure the IEC, the sulfonic acid groups are converted into the free acid. For this purpose, the polymer is treated with acid in a manner known per se, and excess acid is removed by washing. The sulfonated polymer is for this purpose firstly treated in boiling water for 2 hours. Excess water is subsequently dabbed off and the sample is dried at 160° C. in a vacuum drying oven at p<1 mbar for 15 hours. The dry weight of the membrane is then determined. The polymer which has been dried in this way is then dissolved in DMSO at 80° C. over a period of 1 hour. The solution is subsequently titrated with 0.1 M NaOH. The ion exchange capacity (IEC) is then calculated from the consumption of acid to the equivalence point and the dry weight. Such polymers are known to those skilled in the art. Thus, polymers containing sulfonic acid groups can be prepared, for example, by sulfonation of polymers. Processes for the sulfonation of polymers are described in F. Kucera et. al. Polymer Engineering and Science 1988, Vol. 38, No 5, 783-792. Here, the sulfonation conditions can be selected so that a low degree of sulfonation is obtained (DE-A-19959289).

A further class of nonfluorinated polymers has thus been developed by sulfonation of high-temperature-stable thermoplastics. Thus, sulfonated polyether ketones (DE-A-4219077, WO96/01177), sulfonated polysulfones (J. Membr. Sci. 83 (1993) p. 211) or sulfonated polyphenylene sulfide (DE-A-19527435) are known.

U.S. Pat. No. 6,110,616 describes copolymers of butadiene and styrene and their subsequent sulfonation for use in fuel cells.

Furthermore, such polymers can also be obtained by polymerization reactions of monomers comprising acid groups. Thus, perfluorinated polymers can be prepared as described in U.S. Pat. No. 5,422,411 by copolymerization of trifluorostyrene and sulfonylmodified trifluorostyrene.

These perfluorosulfonic acid polymers include, inter alia, Nafion® (U.S. Pat. No. 3,692,569). This polymer can, as described in U.S. Pat. No. 4,453,991, be brought into solution and then be used as ionomer.

Preferred polymers having acid groups include, inter alia, sulfonated polyether ketones, sulfonated polysulfones, sulfonated polyphenylene sulfides, perfluorinated polymers containing sulfonic acid groups, as described in U.S. Pat. No. 3,692,569, U.S. Pat. No. 5,422,411 and U.S. Pat. No. 6,110,616.

The mixture obtained in step A) is heated to a temperature of up to 400° C., in particular 350° C., preferably up to 280° C., in particular from 100° C. to 250° C. and particularly preferably in the range from 200° C. to 250° C., in step B). This is carried out using an inert gas, for example, nitrogen or a noble gas such as neon, argon. It has also been found that when aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid are used, the temperature in step B) is advantageously in the range up to 300° C., preferably from 100° C. to 250° C.

In one variant of the process, the heating according to step B) can be carried out after formation of a sheet-like structure according to step C).

In addition, the mixture prepared in step A) and/or B) can further comprise organic solvents. These can have a positive effect on the processability. Thus, for example, the rheology of the solution can be improved so that it can be extruded or spread by means of a doctor blade more easily.

To achieve a further improvement in the use properties, fillers, in particular proton-conducting fillers, and additional acids can also be added to the membrane. The addition can be carried out, for example, in step A), step B) and/or step C). Furthermore, these additives can, if they are in liquid form, also be added after the polymerization according to step D).

Nonlimiting examples of proton-conducting fillers are
sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$,
polyacids such as $H_3PW_{12}O_{40} \cdot nH_2O$ (n=21-29), $H_3SiW_{12}O_{40} \cdot nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_2$, $HSbTeO_6$, $H_5Ti_4O_9$, $HSbO_3$, $H_2MoO_4$,
selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$,
phosphides such as ZrP, TiP, HfP
oxides such as $Al_2O_3$, $Sb_2O_5$, $ThO_2$, $SnO_2$, $ZrO_2$, $MoO_3$,
silicates such as zeolites, zeolites ($NH_4^+$), sheet silicates, framework silicates, H-natrolites, H-mordenites, $NH_4$-analcines, $NH_4$-sodalites, $NH_4$-gallates, H-montmorillonites,
acids such as $HClO_4$, $SbF_5$,
fillers such as carbides, in particular SiC, $Si_3N_4$, fibers, in particular glass fibers, glass powders and/or polymer fibers, preferably ones based on polyazoles.

These additives can be present in customary amounts in the proton-conducting polymer membrane, but the positive properties such as high conductivity, long life and high mechanical stability of the membrane should not be impaired too much by addition of excessive amounts of additives. In general, the membrane after the treatment according to step D) contains not more than 80% by weight, preferably not more than 50% by weight and particularly preferably not more than 20% by weight, of additives.

In addition, this membrane can further comprise perfluorinated sulfonic acid additives (0.1-20% by weight, preferably 0.2-15% by weight, very particularly preferably 0.2-10% by weight). These additives lead to an increase in power, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902, and Perfluorosulfonimides as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385-90.)

Nonlimiting examples of perfluorinated additives are: trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

The formation of the sheet-like structure in step C) is carried out by means of measures known per se from the prior art for polymer film production (casting, spraying, spreading by doctor blade, extrusion). Suitable supports are all supports which are inert under the conditions. These supports include, in particular, films of polyethylene terephthalate (PET), polytetrafluoroethylene (PTFE), polyhexafluoropropylene, copolymers of PTFE with hexafluoropropylene, polyimides, polyphenylene sulfides (PPS) and polypropylene (PP).

To adjust the viscosity, the solution can, if appropriate, be admixed with a volatile organic solvent. In this way, the viscosity can be set to the desired value and the formation of the membrane can be made easier.

The thickness of the sheet-like structure formed in step C) is preferably in the range from 10 to 4000 μm, more preferably from 15 to 3500 μm, in particular from 20 to 3000 μm, particularly preferably from 30 to 1500 μm and very particularly preferably from 50 to 1200 μm.

The treatment of the membrane in step D) is carried out, in particular, at temperatures in the range from 0° C. to 150° C., preferably at temperatures in the range from 10° C. to 120° C., in particular from room temperature (20° C.) to 90° C., in the presence of moisture or water and/or water vapor. The treatment is preferably carried out under atmospheric pressure, but can also be carried out under superatmospheric pressure. It is important that the treatment is carried out in the presence of sufficient moisture, as a result of which the polyphosphoric acid present is partially hydrolyzed to form low molecular weight polyphosphoric acid and/or phosphoric acid and thus contributes to strengthening of the membrane.

The partial hydrolysis of the polyphosphoric acid in step D) leads to a strengthening of the membrane and to a decrease in the layer thickness and formation of a membrane. The strengthened membrane generally has a thickness in the range from 15 to 3000 μm, preferably from 20 to 2000 μm, in particular from 20 to 1500 μm, with the membrane being self-supporting.

The strengthening of the membrane in step D) also increases its hardness, which can be determined by means of microhardness measurement in accordance with DIN 50539. For this purpose, the membrane is gradually loaded with a Vickers diamond up to a force of 3 mN over a period of 20 s and the penetration depth is determined. According to this measurement, the hardness at room temperature is at least 5 mN/mm$^2$ and preferably 20 mN/mm$^2$, without this constituting a restriction. At these hardness values, the membranes are generally self-supporting. The force is subsequently kept constant at 3 mN for 5 s and the creep is calculated from the penetration depth. In the case of preferred membranes, the creep $C_{HU}$ 0.003/20/5 under these conditions is less than 30%, preferably less than 15% and very particularly preferably less than 5%. The modulus determined by means of microhardness measurement YHU is at least 0.1 MPa, in particular at least 2 MPa and very particularly preferably at least 5 MPa, without this constituting a restriction. The hardness of the membrane relates both to a surface on which no catalyst layer is present and to a side bearing a catalyst layer.

The upper temperature limit for the treatment according to step D) is generally 150° C. If the action of moisture is extremely brief, for example in the case of superheated steam, this steam can also be hotter than 150° C. The duration of the treatment is critical for the temperature upper limit.

The partial hydrolysis (step D) can also be carried out in chambers having a controlled temperature and humidity, in which case the hydrolysis can be controlled in a targeted fashion in the presence of a defined amount of moisture. The humidity can be set to a specific value by means of the temperature or saturation of the environment in contact with the membrane, for example gases such as air, nitrogen, carbon dioxide or other suitable gases or steam. The treatment time is dependent on the values selected from the above parameters.

The treatment time is also dependent on the thickness of the membrane.

In general, the treatment time ranges from a few seconds to some minutes, for example in the presence of superheated steam, or up to entire days, for example in air at room temperature and relatively low atmospheric humidity. The treatment time is preferably from 10 seconds to 300 hours, in particular from 1 minute to 200 hours.

If the partial hydrolysis is carried out at room temperature (20° C.) by means of ambient air at a relative atmospheric humidity of 40-80%, the treatment time is in the range from 1 to 200 hours.

The membrane obtained according to step D) can be self-supporting, i.e. it can be detached from the support without damage and subsequently, if appropriate, be directly processed further.

The concentration of phosphoric acid and thus the conductivity of the polymer membrane of the invention can be set via the degree of hydrolysis, i.e. the time, temperature and ambient humidity. According to the invention, the concentration of the phosphoric acid is reported as mol of acid per mol of repeating units in the polymer. For the purposes of the present invention, a concentration (mol of phosphoric acid per mol of repeating units of the formula (III), i.e. polybenzimidazole) of from 10 to 80, in particular from 12 to 60, is preferred. Such high degrees of doping (concentrations) can be obtained only with difficulty, if at all, by doping of polyazoles with commercially available ortho-phosphoric acid.

Various methods can be used for applying at least one catalyst layer according to step E). Thus, for example, a support provided with a catalyst-containing coating can be used in step C) in order to provide the layer formed in step C) with a catalyst layer.

Here, the membrane can be provided with a catalyst layer on one or both sides. If the membrane is provided with a catalyst layer on only one side, then the opposite side of the membrane has to be pressed onto an electrode which does not have a catalyst layer. If both sides of the membrane are to be provided with a catalyst layer, the following methods can also be employed in combination in order to achieve an optimum result.

According to the invention, the catalyst layer can be applied by a process in which a catalyst suspension is used. Furthermore, it is also possible to use powders comprising the catalyst.

The catalyst suspension comprises a catalytically active substance. Such substances include, inter alia, noble metals, in particular platinum, palladium, rhodium, iridium and/or ruthenium. These substances can also be used in the form of alloys with one another. Furthermore, the substances can also be used in alloys with base metals such as Cr, Zr, Ni, Co and/or Ti. The oxides of the abovementioned noble metals and/or base metals can also be used.

In a particular embodiment of the present invention, the catalytically active compounds are used in the form of particles which preferably have a size in the range from 1 to 1000 nm, in particular from 10 to 200 nm and more preferably from 20 to 100 nm.

The catalytically active particles which comprise the abovementioned substances can be used as metal powders, known as noble metal black, in particular platinum and/or platinum alloys. Such particles generally have a size in the range from 5 nm to 200 nm, preferably in the range from 10 nm to 100 nm.

Furthermore, the metals can also be used on a support material. This support preferably comprises carbon which can be used, in particular, in the form of carbon black, graphite or graphitized carbon black. The metal content of these supported particles, based on the total weight of the particles, is generally in the range from 1 to 80% by weight, preferably from 5 to 60% by weight and particularly preferably from 10 to 50% by weight, without this constituting a restriction. The particle size of the support, in particular the size of the carbon particles, is preferably in the range from 20 to 100 nm, in particular from 30 to 60 nm. The size of the metal particles present thereon is preferably in the range from 1 to 20 nm, in particular from 1 to 10 nm and particularly preferably from 2 to 6 nm.

The sizes of the various particles are means of the weight average and can be determined by means of transmission electron microscopy.

The catalytically active particles described above are generally commercially available.

Furthermore, the catalyst suspension can contain customary additives. These include, inter alia, fluoropolymers such as polytetrafluoroethylene (PTFE), thickeners, in particular water-soluble polymers such as cellulose derivatives, polyvinyl alcohol, polyethylene glycol, and surface-active substances.

Surface-active substances include, in particular, ionic surfactants, for example fatty acid salts, in particular sodium laurate, potassium oleate; and alkylsulfonic acids, alkylsulfonic acid salts, in particular sodium perfluorohexanesulfonate, lithium perfluorohexanesulfonate, ammonium perfluorohexanesulfonate, perfluorohexanesulfonic acid, potassium nonafluorobutanesulfonate, and also nonionic surfactants, in particular ethoxylated fatty alcohols and polyethylene glycols.

Furthermore, the catalyst suspension can comprise constituents which are liquid at room temperature. These include, inter alia, organic solvents which may be polar or nonpolar, phosphoric acid, polyphosphoric acid and/or water. The catalyst suspension preferably contains from 1 to 99% by weight, in particular from 10 to 80% by weight, of liquid constituents.

Polar, organic solvents include, in particular, alcohols such as ethanol, propanol and/or butanol.

Organic, nonpolar solvents include, inter alia, known thin film diluents such as thin film diluent 8470 from DuPont, which comprises turpentine oils.

Particularly preferred additives are fluoropolymers, in particular tetrafluoroethylene polymers. In a particular embodiment of the present invention, the weight ratio of fluoropolymer to catalyst material comprising at least one noble metal and, if appropriate, one or more support materials is greater than 0.1, preferably in the range from 0.2 to 0.6.

The catalyst suspension can be applied to the membrane in step C) and/or step D) by customary methods. Depending on the viscosity of the suspension, which can also be in paste form, various methods by means of which the suspension can be applied are known. Suitable methods include processes for coating films, woven fabrics, textiles and/or papers, in particular spray processes and printing processes such as template printing processes and screen printing processes, inkjet processes, roller application, in particular halftone roller application, slit nozzle application and doctor blade coating. The respective method and the viscosity of the catalyst suspension are dependent on the hardness of the membrane.

The viscosity can be influenced by the solids content, in particular the proportion of catalytically active particles, and the proportion of additives. The viscosity to be set is dependent on the method of applying the catalyst suspension, with the optimal values and their determination being well known to those skilled in the art.

Depending on the hardness of the membrane, the bonding of catalyst and membrane can be improved by heating and/or pressing. In addition, the bonding between membrane and catalyst is strengthened by a treatment according to step b).

Furthermore, the application of a catalyst layer according to step E) can be carried out simultaneously with the treatment of the membrane until it is self-supporting according to step D). This can be effected by, for example, a water-containing catalyst suspension being applied to the sheet-like structure obtained in step C). For this purpose, the suspension can be sprayed in the form of fine droplets onto the sheet-like structure formed in step C). Apart from water, the suspension can further comprise additional solvents and/or diluents. Depending on the water content, curing of the membrane is effected in step D). The water content can accordingly vary within a wide range. The water content is preferably in the range from 0.1 to 99% by weight, in particular from 1 to 95% by weight, based on the catalyst suspension.

In a particular embodiment of the present invention, the catalyst layer is applied by a powder process in step E). Here, a catalyst powder which can contain additional additives as described by way of example above is used.

The catalyst powder can be applied using, inter alia, spray processes and screen processes. In the case of the spray process, the powder mixture is sprayed onto the membrane by means of a nozzle, for example a slit nozzle. In general, the membrane provided with a catalyst layer is subsequently heated to improve the bonding between catalyst and membrane. The heating can, for example, be achieved by means of a hot roller. Such methods and apparatuses for applying the powder are described, inter alia, in DE 195 09 748, DE 195 09 749 and DE 197 57 492.

In the screen process, the catalyst powder is applied to the membrane using a shaking screen. An apparatus for applying a catalyst powder to a membrane is described in WO 00/26982. After application of the catalyst powder, the bonding between catalyst and membrane can be improved by means of heating and/or step D). Here, the membrane provided with at least one catalyst layer can be heated to a temperature in the range from 50 to 200° C., in particular from 100 to 180° C.

In addition, the catalyst layer can be applied in step E) by a method in which a catalyst-containing coating is applied to a support and the catalyst-containing coating present on the support is subsequently transferred to the membrane obtained according to step C) and/or step D). Such a method is described by way of example in WO 92/15121.

The support provided with a catalyst coating can, for example, be produced by preparing an above-described catalyst suspension. This catalyst suspension is subsequently applied to a support film, for example a polytetrafluoroethylene film. After application of the suspension, volatile constituents are removed.

The transfer of the coating comprising a catalyst can be carried out by, inter alia, hot pressing. For this purpose, the assembly comprising a catalyst layer and a membrane and a support film is heated to a temperature in the range from 50° C. to 200° C. and pressed under a pressure of from 0.1 to 5 MPa. In general, a few seconds suffice to join the catalyst layer to the membrane. This time is preferably in the range from 1 second to 5 minutes, in particular from 5 seconds to 1 minute. In a particular embodiment of the present invention, the catalyst layer has a thickness in the range from 1 to 1000 µm, in particular from 5 to 500 µm, preferably from 10 to 300 µm. This value represents a mean which can be determined by measuring the layer thickness in cross-sectional micrographs obtained by means of a scanning electron microscope (SEM).

In a particular embodiment of the present invention, the membrane provided with at least one catalyst layer comprises from 0.1 to 10.0 mg/cm$^2$, preferably from 0.3 to 6.0 mg/cm$^2$ and particularly preferably from 0.3 to 3.0 mg/cm$^2$. These values can be determined by elemental analysis on a sheet-like sample.

Subsequent to the treatment according to step D) and/or step E), the membrane can be additionally crosslinked on the surface by the action of heat in the presence of oxygen. This hardening of the membrane achieves an additional improvement in the properties of the membrane. For this purpose, the membrane can be heated to a temperature of at least 150° C., preferably at least 200° C. and particularly preferably at least 250° C. The oxygen concentration in this process step is usually in the range from 5 to 50% by volume, preferably from 10 to 40% by volume, without this constituting a restriction.

Crosslinking can also be effected by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose here is in the range from 5 to 200 kGy.

Depending on the desired degree of crosslinking, the duration of the crosslinking reaction can vary within a wide range. In general, this reaction time is in the range from 1 second to 10 hours, preferably from 1 minute to 1 hour, without this constituting a restriction.

The polymer membrane of the invention displays improved materials properties compared to the previously known doped polymer membranes. In particular, it displays improved power compared to known doped polymer membranes. This is due, in particular, to an improved proton conductivity. At a temperature of 120° C., this is at least 0.1 S/cm, preferably at least 0.11 S/cm, in particular at least 0.12 S/cm. If the membranes of the invention comprise polymers having sulfonic acid groups, the membranes also display a high conductivity at a temperature of 70° C. The conductivity is dependent, inter alia, on the sulfonic acid group content of the membrane. The higher this proportion, the better the conductivity at low temperatures. In this case, a membrane according to the invention can be moistened at low temperatures. For this purpose it is possible, for example, to provide the compound used as energy source, for example hydrogen, with a proportion of water. However, the water formed by the reaction is in many cases sufficient to achieve moistening.

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model comprising a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before commencement of the measurement.

Possible fields of use of the polymer membranes of the invention include, inter alia, use in fuel cells, in electrolysis, in capacitors and in battery systems.

The present invention also provides a membrane-electrode unit comprising at least one polymer membrane according to the invention. For further information on membrane-electrode units, reference may be made to the specialist literature, in particular the patents U.S. Pat. No. 4,191,618, U.S. Pat. No. 4,212,714 and U.S. Pat. No. 4,333,805. The disclosure of the abovementioned references [U.S. Pat. No. 4,191,618, U.S. Pat. No. 4,212,714 and U.S. Pat. No. 4,333,805] in respect of the structure and the production of membrane-electrode units and also the electrodes, gas diffusion layers and catalysts to be selected is incorporated by reference into the present description.

To produce a membrane-electrode unit, the membrane of the invention can be joined to a gas diffusion layer. If the membrane is provided on both sides with a catalyst layer, the gas diffusion layer does not have to have a catalyst present on it before pressing. However, it is also possible to use gas diffusion layers provided with a catalytically active layer. The gas diffusion layer generally displays electrode conductivity. It is usual to employ sheet-like, electrically conductive and acid-resistant structures for this purpose. These include, for example, carbon fiber papers, graphitized carbon fiber papers, woven carbon fiber fabrics, graphitized woven carbon fiber fabrics and/or sheet-like structures which have been made conductive by addition of carbon black.

A membrane-electrode unit according to the invention displays a surprisingly high power density. In a particular embodiment, preferred membrane-electrode units give a current density of at least 0.1 A/cm$^2$, preferably 0.2 A/cm$^2$, particularly preferably 0.4 A/cm$^2$. This current density is measured in operation using pure hydrogen at the anode and air (about 20% by volume of oxygen, about 80% by volume of nitrogen) at the cathode at atmospheric pressure (1013 mbar absolute, with open cell outlet) and a cell voltage of 0.6V. Particularly high temperatures in the range 150-200° C., preferably 160-180° C., in particular 170° C. can be used here.

The abovementioned power densities can also be achieved at a low stoichiometry of the fuel gases on both sides. In a particular embodiment of the present invention, the stoichiometry is less than or equal to 2, preferably less than or equal to 1.5, very particularly preferably less than or equal to 1.2

In a particular embodiment of the present invention, the catalyst layer has a low noble metal content. The noble metal content of a preferred catalyst layer present in a membrane according to the invention is preferably not more than 2 mg/cm$^2$, in particular not more than 1 mg/cm$^2$, very particularly preferably not more 0.5 mg/cm$^2$. In a particular embodiment of the present invention, one side of a membrane has a higher metal content than the opposite side of the membrane. The metal content on the one side is preferably at least twice the metal content on the opposite side.

In one variant of the present invention, membrane formation can be carried out directly on the electrode rather than on a support. The treatment according to step D) can in this way be correspondingly shortened, since the membrane no longer has to be self-supporting. Such a membrane is also provided by the present invention.

The present invention further provides an electrode having a proton-conducting polymer coating which is obtainable by a process comprising the steps
A) preparation of a mixture comprising
  polyphosphoric acid,
  at least one polyazole (polymer A) and/or one or more compounds which are suitable for forming polyazoles under the action of heat according to step B),
B) heating of the mixture obtainable according to step A) under inert gas to temperatures of up to 400° C.,
C) application of a layer using the mixture obtained according to step A) and/or B) to an electrode,
D) treatment of the membrane formed in step C),
E) application of a catalyst layer to the membrane formed in step C) and/or in step D).

For the sake of completeness, it should be stated that all preferred embodiments of a self-supporting membrane apply analogously for a membrane applied directly to the electrode.

In a particular embodiment of the present invention, the coating has a thickness of from 2 to 3000 μm, preferably from 2 to 2000 μm, in particular from 3 to 1500 μm, particularly preferably from 5 to 500 μm and very particularly preferably from 10 to 200 μm, without this constituting a restriction.

The treatment according to step D) leads to a hardening of the coating. The treatment is carried out until the coating has a hardness which is sufficient to enable it to be pressed to produce a membrane-electrode unit. A sufficient hardness is ensured when a membrane treated in this way is self-supporting. However, a lower hardness is sufficient in many cases. The hardness determined in accordance with DIN 50539 (microhardness measurement) is generally at least 1 mN/mm², preferably at least 5 mN/mm² and very particularly preferably at least 15 mN/mm², without this constituting a restriction.

An electrode which has been coated in this way can be installed in a membrane-electrode unit which, if appropriate, has at least one polymer membrane according to the invention.

The invention claimed is:

1. A proton-conducting polymer membrane which comprises polyazoles and is coated with a catalyst layer and is obtainable by a process comprising the steps
   A) preparation of a mixture comprising polyphosphoric acid,
      at least one polyazole (polymer A) and/or one or more compounds which are suitable for forming polyazoles under the action of heat according to step B),
   B) heating of the mixture obtainable according to step A) under inert gas to temperatures of up to 400° C.,
   C) application of a layer using the mixture according to step A) and/or B) to a support,
   D) treatment of the membrane formed in step C) in the presence of moisture until it is self-supporting,
   E) application of at least one catalyst layer to the membrane formed in step C) and/or in step D).

2. The membrane as claimed in claim 1, characterized in that the support used in step C) has been provided with a catalyst-containing coating in order to provide the layer formed in step C) with a catalyst layer.

3. The membrane as claimed in claim 1, characterized in that the steps D) and B) are carried out simultaneously, with the membrane obtained in step C) being treated until it is self supporting and provided with a catalyst layer in one step.

4. The membrane as claimed in claim 1, characterized in that the catalyst layer is applied by means of a powder process as in step B).

5. The membrane as claimed in claim 1, characterized in that the catalyst layer is applied in step E) by means of a process in which a catalyst suspension is used.

6. The membrane as claimed in claim 5, characterized in that the catalyst suspension comprises at least one organic, nonpolar solvent.

7. The membrane as claimed in claim 5, characterized in that the catalyst suspension comprises phosphoric acid and/or polyphosphoric acid.

8. The membrane as claimed in claim 1, characterized in that the catalyst layer is applied in step E) by means of a process in which a catalyst-containing coating is applied to a support and the catalyst-containing coating present on the support is subsequently transferred to the membrane obtained according to step C) and/or step D).

9. The membrane as claimed in claim 8, characterized in that the transfer of the catalyst-containing coating is effected by hot pressing.

10. The membrane as claimed in claim 1, characterized in that the mixture prepared in step A) comprises compounds which are suitable for forming polyazoles under the action of heat according to step B), with these compounds comprising one or more aromatic and/or heteroaromatic tetraamino compounds and one or more aromatic and/or heteroaromatic carboxylic acids or derivatives thereof which have at least two acid groups per carboxylic acid monomer, and/or one or more aromatic and/or heteroaromatic diaminocarboxylic acids.

11. The membrane as claimed in claim 10, characterized in that aromatic and/or heteroaromatic tetraamino compounds used as compounds suitable for forming polyazoles comprise compounds selected from the group consisting of 3,3',4,4'-tetraaminobiphenyl, 2,3,5,6-tetraaminopyridine and 1,2,4,5-tetraaminobenzene.

12. The membrane as claimed in claim 10, characterized in that aromatic and/or hetero aromatic carboxylic acids or derivatives thereof containing at least two acid groups per carboxylic acid monomer which are used as compounds suitable for forming polyazoles comprise compounds selected from the group consisting of isophthalic acid, tereplithalic acid, phthalic acid, 5-hydroxyisophthalic acid, 4-hydroxyisoplithalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyphthalic acid, 2,3-dihydroxyphtalic acid, 2,4-dihydroxyplithalic acid, 3,4-dihydroxyphihalic acid, 3-fluoroplithalic acid, 5-fluoroisophthalic acid, 2-fluoroterephthalic acid, tetrafluorophihalic acid, tetrafluoroisoplithalic acid, tetrafluoroterephihalic acid, 1,4-naphthalenedicarboxylic acid, 1,5-naphthalenedicarboxylic acid, 2,6-naphthalenedicarboxylic acid, 2,7-naplithalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, their C1-C20-alkyl esters, their C5-C12-aryl esters, their acid anhydrides, and their acid chlorides.

13. The membrane as claimed in claim 10, characterized in that the compounds suitable for forming polyazoles comprise aromatic tricarboxylie acids, their C1-C20-alkyl esters or C5-C12-aryl esters or their acid anhydrides or their acid halides or tetracarboxylic acids, their C1-C20-alkyl esters or C5-C12-aryl esters or their acid anhydrides or their acid halides.

14. The membrane as claimed in claim 13, characterized in that the aromatic tricarboxylic acids comprise compounds selected from the group consisting of 1,3,5-benzoltricarboxylic acid (trimesic acid); 2,4,5-benzoltricarboxylic acid (trimellitie acid); (2-carboxyphenyl)iminodiacetic acid, 3,5,3'-biphenyhricarboxylic acid; 3,5,4'-biphenyltricarboxylic acid, 2,4,6-pyridinetricarboxylic acid, benzene-1,2,4,5-tetracarboxylic acid; naphthalene-1,4,5,8-tetracarboxylic acid, 3,5,3',5-biphenyltetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid and 1,4,5,8-naphthalenetetracarboxylic acid.

15. The membrane as claimed in claim 13, characterized in that the content of tricarboxylic acids and/or tetracarboxylic acids is in the range from 0 to 30 mol % based on dicarboxylic acid used.

16. The membrane as claimed in claim 10, characterized in that the compounds suitable for forming polyazoles comprise heteroaromatic dicarboxylic acids, tricarboxylic acids and/or tetracarboxylic acids containing at least one nitrogen, oxygen, sulfur or phosphorus atom in the aromatic.

17. The membrane as claimed in claim 16, characterized in that pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylie acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides are used.

18. The membrane as claimed in claim 10, characterized in that the compounds suitable for forming polyazoles comprise diaminobenzoic acid and/or its monohydrochloride and dihydrochloride derivatives.

19. The membrane as claimed in claim 1, characterized in that the mixture prepared in step A) comprises compounds which are suitable for forming polyazoles under the action of heat according to step B), with these compounds being obtainable by reaction of one or more aromatic and/or hetero aromatic tertramino compounds with one or more aromatic and/or heteroaromatic carboxylic acids or derivatives thereof which have at least two acid groups per carboxylic acid monomer or of one or more aromatic and/or hetero aromatic diaminocarboxylic acids in the melt at temperatures of up to 400° C.

20. The membrane as claimed in claim 1, characterized in that the heating according to step B) is carried out after formation of a sheet-like structure according to step C).

21. The membrane as claimed in claim 1, characterized in that the treatment according to step D) is carried out at temperatures in the range from 0° C. to 150° C.

22. The membrane as claimed in claim 1, characterized in that the treatment of the membrane in step D) is in the range from 10 seconds to 300 hours.

23. The membrane as claimed in claim 1, characterized in that the membrane formed after step D) and/or step E) is crosslinked by action of oxygen.

24. The membrane as claimed in claim 1, characterized in that a layer having a thickness of from 20 to 4000 µm is produced in step C).

25. The membrane as claimed in claim 1, characterized in that the membrane formed after step D) has a thickness in the range from 15 to 3000 µm.

26. The membrane as claimed in claim 1, characterized in that the catalyst layer has a thickness in the range from 0.1 to 50 µm.

27. The membrane as claimed in claim 1, characterized in that the catalyst layer comprises catalytically active particles which have a size in the range from 0.1 to 10 µm.

28. The membrane as claimed in claim 27, characterized in that the catalytically active substance comprises particles comprising platinum, palladium, gold, rhodium, iridium and/or ruthenium.

29. The membrane as claimed in claim 28, characterized in that the catalytically active particles comprise carbon.

30. The membrane as claimed in claim 1, characterized in that the membrane provided with a catalyst layer comprises from 0.1 to 10 g/m² of a catalytically active substance.

31. A membrane-electrode unit comprising at least one electrode and at least one membrane as claimed in claim 1.

32. A fuel cell comprising one or more membrane-electrode units as claimed in claim 31.

* * * * *